United States Patent [19]

Honigsbaum

[11] 4,197,474
[45] Apr. 8, 1980

[54] HERMETIC CLUTCH

[76] Inventor: Richard F. Honigsbaum, 21 A Barry Gardens, Passaic, N.J. 07055

[21] Appl. No.: 834,529

[22] Filed: Sep. 19, 1977

[51] Int. Cl.² .......................................... H02K 49/00
[52] U.S. Cl. ..................................... 310/104; 310/86; 310/105
[58] Field of Search ................... 310/104, 105, 85–87, 310/94, 95, 103

[56]  References Cited
  U.S. PATENT DOCUMENTS

| | | | |
|---|---|---|---|
| 3,027,472 | 3/1962 | Galtz et al. | 310/104 |
| 3,050,646 | 8/1962 | Eddy et al. | 310/104 |
| 3,051,858 | 8/1962 | McCown et al. | 310/104 |
| 3,157,808 | 11/1964 | Lloyd | 310/104 |
| 3,254,248 | 5/1966 | Hagen | 310/86 |

*Primary Examiner*—Donovan F. Duggan
*Attorney, Agent, or Firm*—Hubbell, Cohen, Stiefel & Gross

[57]  ABSTRACT

An improved hermetic clutch for driving a shaft and adapted for securement to a non-rotating supporting structure includes first and second elongate annular members, the second being concentrically disposed within the first with the shaft coupled to one of the members for rotation therewith. Means are provided for electromagnetically coupling the members for imparting rotation to the one member upon mechanical rotation of the other. The assembly also includes a "can"-shaped hermetic seal disposed between the two members and fixedly secured at its open end to the supporting structure, and means mechanically coupled to the stationary support and the seal for preloading the seal in axial tension to enhance the structural integrity thereof. Means are also provided for supporting each of the members for rotation relative to the seal, and for maintaining concentricity therebetween.

35 Claims, 6 Drawing Figures

FIG. 3.
FIG. 4.
FIG. 5.
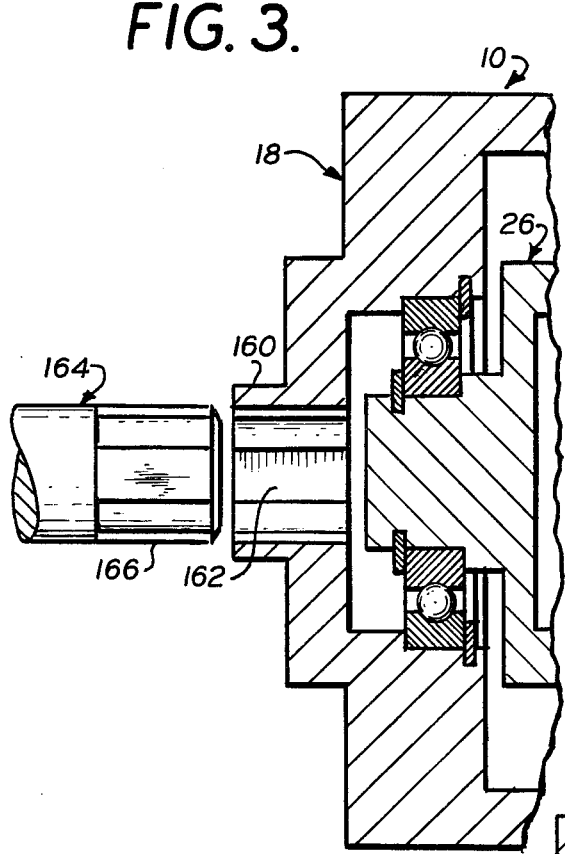
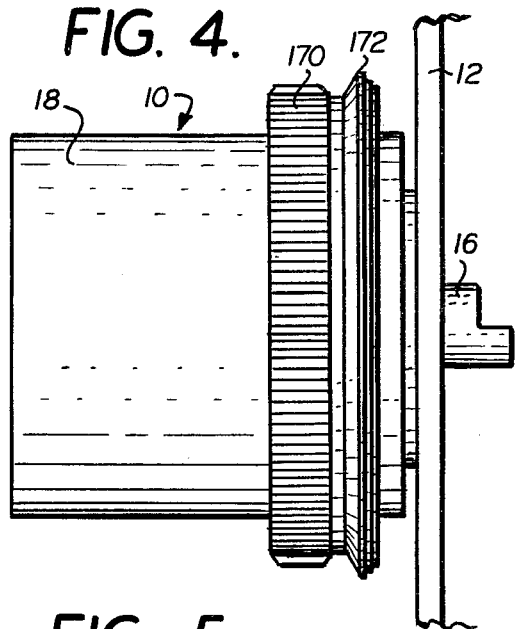
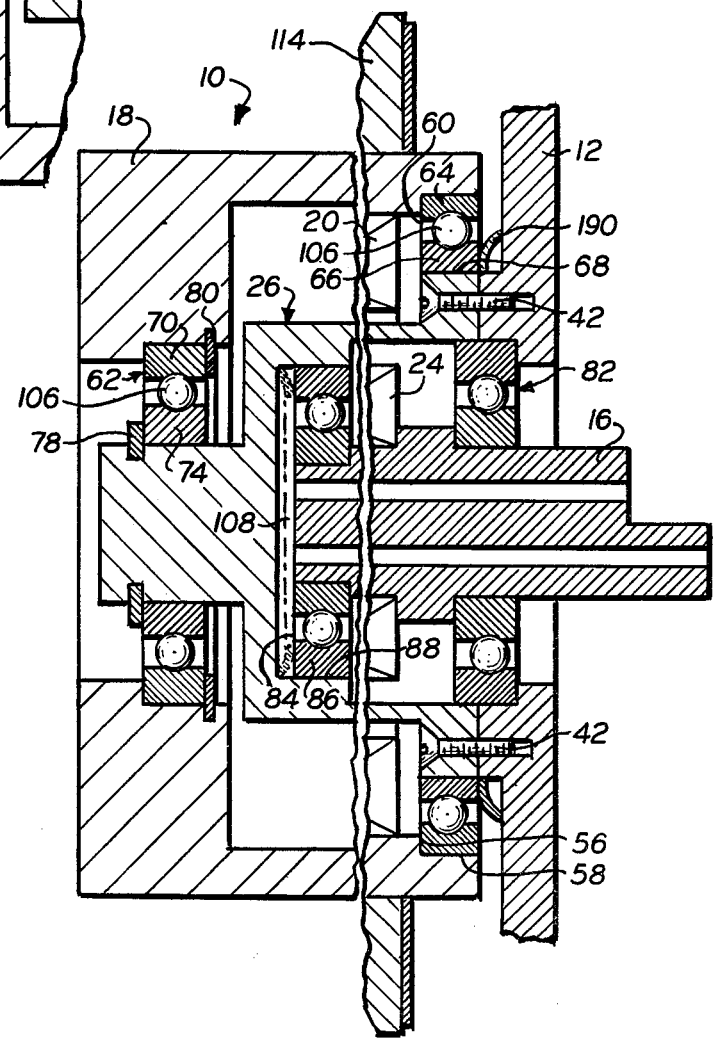

HERMETIC CLUTCH

BACKGROUND OF THE INVENTION

1. Field of the Invention

This invention pertains to clutches of the type wherein the driving member is electromagnetically coupled to the driven member and both members are in rotation during use. More particularly, this invention pertains to clutches of the type described, wherein the members are hermetically isolated from each other.

2. Prior Art

One of the principal defects of conventional automotive air conditioners is the limited life of the compressor shaft seal and the loss of refrigerant which results when this seal fails. This defect has been eliminated from conventional room air conditioners by immersing the drive motor in the refrigerant and thus dispensing with the seal. In automotive air conditioners, however, compressors are driven mechanically, and shaft seals serve to confine the refrigerant. While such seals are effective when new, they do not remain so, and the resulting leakage not only renders the air conditioning system inoperative, but worse, adds to the fluorocarbon pollution of the atmosphere.

While the alternative of regular shaft seal replacement does exist, it is not viable from a consumer point of view. Equally impractical is the conversion of the conventional automotive air conditioner from mechanical to electrical hermetic drive, Since such an arrangement involves not only the initial equipment cost of an electric motor and an alternator large enough to drive it, but also the additional engine fuel needed to offset the additional losses of double energy conversion.

Hermetic shaft seals for other applications have been suggested. Thus, five patents directed to magnetically coupled pump assemblies have been issued to R. N. Zimmermann (U.S. Pat. Nos. 3,802,804; 3,545,892; 3,465,681; Re26,094; 3,205,827) wherein coupling between the impeller and drive shaft is effected by a pair of concentrically disposed permanent magnets, one rotatable with the impeller, the other rotatable with the drive shaft. A non-magnetic shield is interposed in the clearances between the magnets to isolate the impeller from the drive assembly. The synchronous drive employed in Zimmermann's pumps, while satisfactory for electric motor driven impeller pumps, is ill suited for positive displacement compressors such as those used in automotive air conditioners because they develop no starting torque to accommodate clutching, and do not damp the torque pulsations produced by these positive displacement devices.

Moreover, in some of the embodiments disclosed in Zimmermann's U.S. Pat. Nos. 3,205,827; 3,802,804; and Re26,094, the impeller shaft is supported solely by the shield. In these embodiments, shields must be thick enough not only to resist deformation resulting from pressure differences across the shield, but also from impeller loading. Worse, Zimmermann's arrangements do not effectively establish and maintain concentricity between the magnets and the shield, thus necessitating large clearances between these members and requiring magnets large enough to maintain effective coupling despite the large radial spacing.

Another magnetically coupled pump with similar deficiencies is disclosed in an article by Ian A. Hornsby in the Novemeber, 1974 issue of Processing.

U.S. Pat. No. 3,373,927 issued to Miller discloses a magnetically coupled turbine-driven centrifugal compressor in which the turbine and impeller are isolated from one another by a stationary thin wall disposed therebetween. This wall is like the shield in Zimmermann's patents in that the thin portion between the coupling magnets is totally unsupported, thus requiring excessive clearances to accommodate flexing.

Another type of hermetic shaft seal, wherein sealing is effected by means of a pressure differential, is disclosed in U.S. Pat. No. 3,392,910 issued to Tanzberger.

SUMMARY OF THE INVENTION

According to the present invention, I have developed a novel hermetic clutch particularly suited for driving the compressor shaft in an automotive air conditioning unit. This structurally superior hermetic arrangement, which replaces the conventional clutch and seal, hermetically seals the compressor, eliminates wear which results when conventionally clutched compressors are cycled, and is a cost-effective alternative to conventional arrangements when maintenance, reliability, and environmental problems are considered.

The preferred assembly includes a rotating annular field structure preferably having a conventional distributed winding. An annular rotor is disposed in the bore defined by the field, the rotor, in turn, being fixedly secured about one end of the compressor shaft for rotation therewith. Preferably, the rotor winding is of the conventional "squirrel cage" variety. A "can"-shaped seal, the material of which is desirably non-conducting electrically but magnetically transmissive, is interposed between the field and rotor. The seal is supported by the compressor housing and is preferably secured thereto by a plurality of screws or other suitable elements which extend through a radially outwardly extending flange at the open end of the seal and into threaded blind holes in the housing.

The rotor-shaft assembly is preferably supported by a pair of bearings disposed on the shaft on either side of the rotor, with their inner races seated on the shaft and their outer races seated on the inner wall of the seal. Similarly, the field structure is preferably supported by a second pair of spaced bearings having their inner races seated about the seal and their outer races seated on the internal wall of the field structure. If desired, the rotor and field bearings on the inboard or compressor side may be partially supported by the compressor housing.

It is thus apparent that the element which serves to hermetically seal the rotor-shaft assembly both maintains and is maintained in co-axial alignment with the rotating elements.

One important feature of the present invention is a spring mechanism, desirably a Belleville washer, which preloads the seal in axial tension, and which, in the preferred embodiment, is interposed between the transverse wall of the seal and the confronting rotor bearing. This tension preloading eliminates the risk of compressive buckling and the resulting destructive contact between the seal and the rotating members which would otherwise occur in service, particularly in automotive applications. With the risk of buckling from this cause eliminated, and with concentricity of rotating members with respect to each other and the seal maintained by the special bearing arrangements described herein, rotor-to-field radial dimensions can be reduced to levels such that effective coupling between these members will result from very modest levels of field power. The spring also accommodates variations in axial dimensions due to accumulation of manufacturing tolerances, pressure and temperature differentials, etc.

In automotive applications, the field structure will typically be rotated by a belt driven pulley and excited by the battery, the resulting interaction between the field and the rotor windings providing the torque to drive the rotor and hence the shaft. Efficient coupling is assured by the combination of small clearances and a thin seal made possible by the novel mechanical design of the present invention. Moreover, because coupling here is the direct result of exciting a coil, rather than an electromagnetically induced mating of friction elements, clutching and de-clutching is effected in the conventional way, but is "wear-free".

While the preferred coupling between the field and rotor is of the induction motor variety, skilled art workers will recognize that synchronous or combination synchronous-induction coupling may also be employed. Further, in applications where a convenient AC source is available, it will be apparent that windings of the field structure made suitable for either battery or AC excitation can be connected to the AC source and that source used to provide the rotating field, in which case the field structure need not be mechanically rotated. This modification is particularly adapted for use in motor homes and similar vehicles since it eliminates the second air conditioning unit which cools the vehicle when the engine is inoperative. When this added feature is included, a simple switch may be used to alternate between DC and AC operation. Skilled art workers will futher recognize that the preferred roles of field as driving member and rotor as driven member can be interchanged.

With particular reference to the drawings, a more complete description of these and other feature of the invention will now be given.

BRIEF DESCRIPTION OF THE DRAWINGS

In the drawings:

FIG. 3 is a fragmentary view in vertical section illustrating an alternative means for rotating the field;

FIG. 4 is a view in side elevation illustrating a further alternative means for rotating the field;

FIG. 5 is a fragmentary view in vertical section illustrating an alternative arrangement for loading the seal in tension; and FIG. 6 is a fragmentary view in vertical section illustrating a further alternative arrangement for loading the seal in tension.

DETAILED DESCRIPTION OF THE PREFERRED EMBODIMENTS

Figure 1:
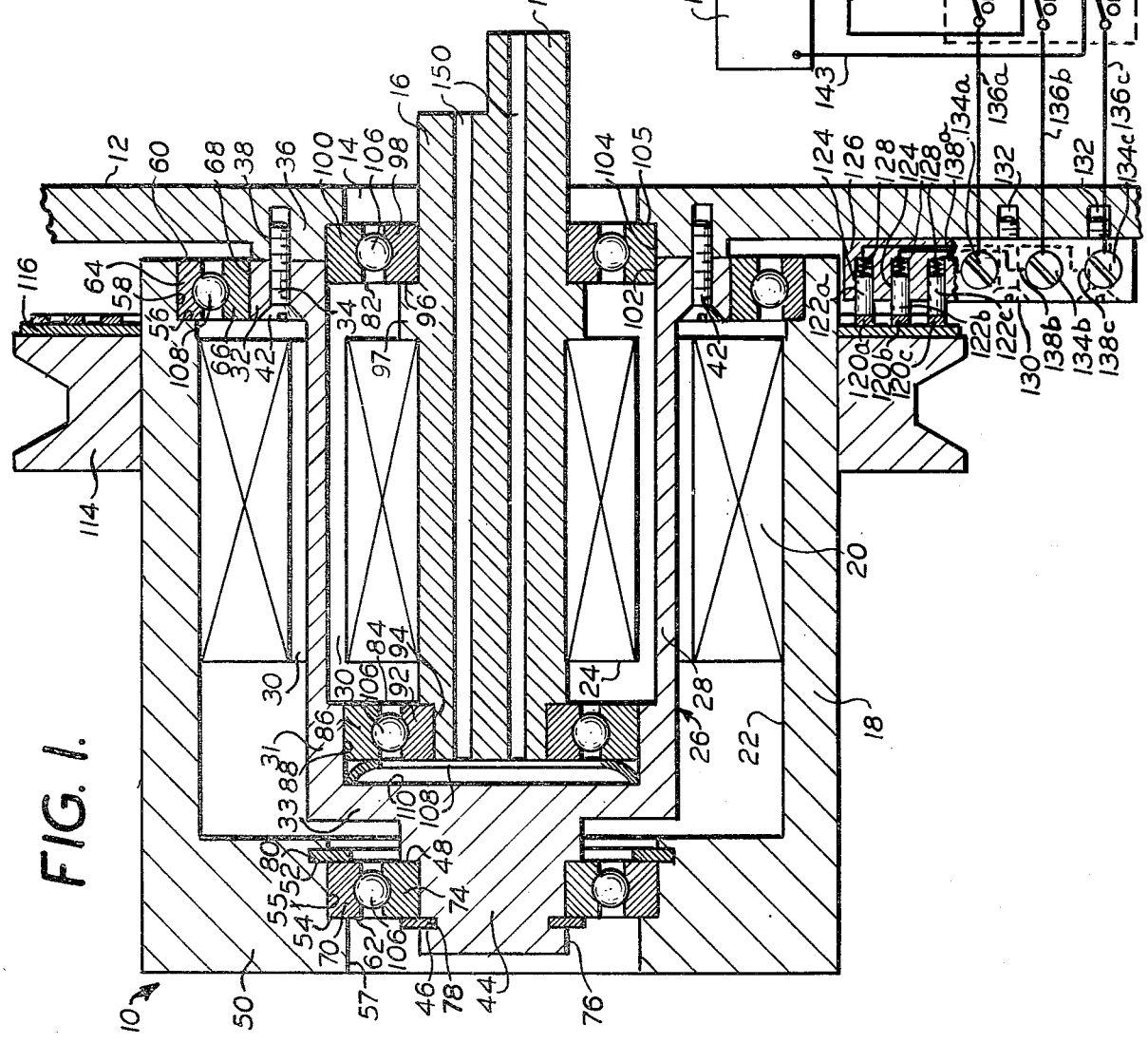
FIG. 1 is a view, partially in vertical section and partially schematic, illustrating the preferred shaft drive assembly of the present invention.
Figure 2:
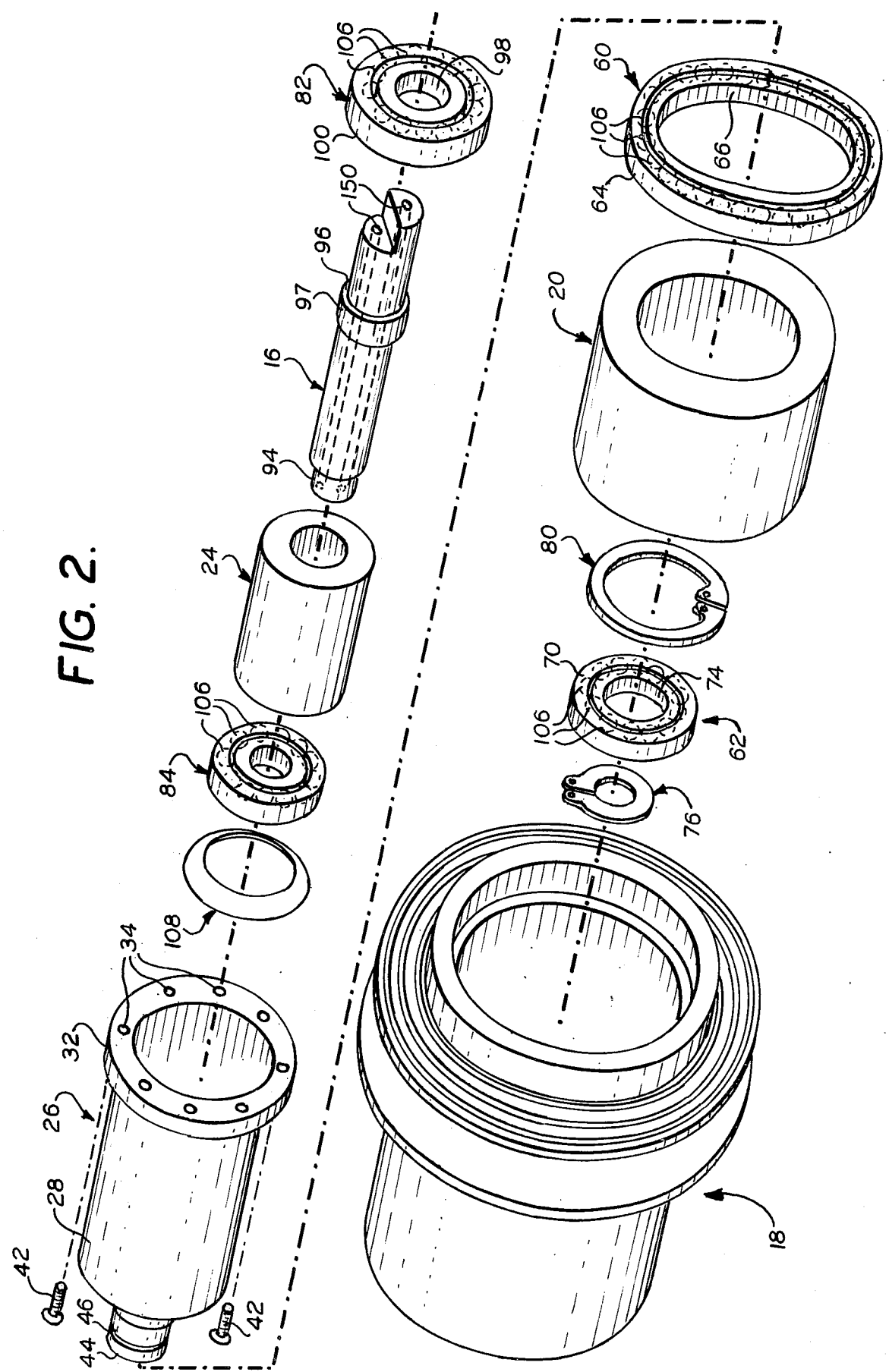
FIG. 2 is an exploded perspective view of the assembly illustrated in FIG. 1 but not showing the electrical connections.

Referring now to the drawings, and in particular to FIGS. 1 and 2 thereof, a compressor shaft drive assembly 10 secured to compressor housing 12 is shown.

As illustrated, assembly 10 includes a first elongate member 18 of generally annular shape. Member 18 may, for example, be cast from iron or aluminum, or fabricated from these or other suitable materials. An annular field 20, to be described in greater detail hereinafter, is affixed to inner wall 22 of the member 18 in any well known manner. Alternatively, field 20 may be integrally formed with the member 18. Assembly 10 also includes an annular rotor 24 concentrically disposed within field 20 and fixedly secured about a compressor shaft 16 which extends through a circular opening 14 in the compressor housing 12. Rotor 24 may be secured to shaft 16 by employing any of the techniques well known to persons skilled in the art, including keying and friction fitting. As will become more fully apparent hereinafter, during operation field 20 and rotor 24 are electromagnetically coupled, and inasmuch as a variety of well known techniques may be employed for this purpose, some of which will be mentioned hereinafter, both field 20 and rotor 24 have been illustrated diagrammatically. In the preferred embodiment, these elements will resemble the stators and rotors of conventional single phase or polyphase induction motors. Thus, the rotor winding is preferably a conventional "squirrel cage" configuration, while the field winding is a conventional single phase or polyphase configuration, the choice being fixed by the nature of the AC supply where AC operation is anticipated, and cost considerations where only DC excitation need be accommodated.

As shown, a "can"-shaped seal 26 is interposed between field 20 and rotor 24. Since, as noted above, rotation of rotor 24 is effected by electromagnetic coupling, those skilled in the art will recognize that coupling efficiency will be enhanced by minimizing clearances between field 20 and rotor 24. Clearly, this requires minimization of the thickness of the portion of seal 26 therebetween. Accordingly, and as shown, seal 26 includes a thinned portion 28 which extends through the air gaps 30 between field 20 and rotor 24. As presently preferred and shown, the end of portion 28 remote from the housing 12 is integral with a thickened portion 31. The portion 31 is, in turn, integral with end wall 33 which is perpendicular to the portion 31 and of approximately the same thickness.

The open end of seal 26 includes a preferably integral radially extending portion which defines a flange 32. Desirably, flange 32 is provided with a plurality of uniformly spaced thru-holes 34 whose axes are parallel to the axis of the shaft 16. As shown, compressor housing 12 preferably includes an annular lip 36 adjacent aperture 14 and in confronting relation with the flange 32. A plurality of spaced threaded blind holes 38 are provided in lip 36 for alignment with thru-holes 34. A plurality of securing elements, preferably screws 42, two of which are illustrated in FIG. 2, extend through thru-holes 34 and are threadably received in blind holes 38 for fixedly securing seal 26 to housing 12.

Since, as noted above, one of the primary purposes of the assembly 10 of the present invention is to hermetically isolate shaft 16 from the environment, it will be apparent to those skilled in the art that in order to accomplish this the interface between flange 32 of seal 26 and lip 36 of compressor housing 12 must be hermetic. Since such hermetic sealing may be accomplished in a variety of ways well known to the skilled art worker, further description thereof is deemed unnecessary.

The outboard end of seal 26, i.e. the end farthest from compressor housing 12, is closed and includes an axial outwardly extending generally cylindrically shaped portion 44 integral with the wall 33. As shown, portion 44 includes a circumferential recess 46 of preferably rectangular cross-section near the outboard end thereof, and a radially outward step defining a shoulder 48.

The outboard end of the member 18 is stepped radially inward to define a thickened portion 50. The radially inward facing surface 55 of portion 50 is provided with a circumferentially extending recess 52 of preferably rectangular cross section, and is stepped radially inward to define a shoulder 54 and a surface 57. The inboard portion of the wall 22 of the member 18 is stepped radially outward to define a shoulder 56 and a surface 58.

As presently preferred and shown, the assembly comprised of member 18 and field 20 is supported for rotation about seal 26 by inboard 60 and outboard 62 ball bearings. In order to accommodate variation in bearing spacing resulting from build-up of manufacturing tolerances, wear, heating, etc., the outer race 64 of ball bearing 60 is preferably friction fitted with radially inward facing surface 58 and in abutting relation with shoulder 56, while the inner race 66 is preferably slideably fitted with the radially outward facing surface 68 of flange 32.

An alternate arrangement accomplishing the same purpose is one in which both races are friction fitted with their respective seats, and axial motion is accommodated by making one of the races, preferably the inner one, removable. This alternate arrangement is well known to persons skilled in the art and needs no further elaboration.

The outer race 70 of outboard ball bearing 62 is preferably friction fitted with the inward facing radial surface 55, and is disposed with its outboard surface abutting shoulder 54 and its inboard surface adjacent recess 52. Inner race 74 of bearing 62 is preferably slideably fitted with the circumferential surface 76 defined by portion 44 in order to avoid buckling the seal during assembly, and is disposed with its inboard surface abutting shoulder 48 and its outboard surface adjacent recess 46. Thus, and as shown, the races of bearing 62 may be secured against axial movement on their seats by snap rings 78 and 80 disposed in recesses 46 and 52, respectively.

The rotor 24-shaft 16 subassembly is supported for rotation relative to seal 26 by inboard 82 and outboard 84 ball bearings respectively. The outer race 86 of ball bearing 84 is preferably slideably seated on the radially inward facing surface 88 of the thickened portion 31 of seal 26 for accommodating variations in the axial dimension of the shaft. The inner race 92 of ball bearing 84 is seated about the shaft 16 in a circumferentially extending recess 94 at the outboard end thereof. As shown, the inner race 98 of bearing 82 is friction-fitted about shaft 16 in abutting relation with a shoulder 96 defined by a radially outward step in the shaft. With particular reference to FIG. 2, the annular member 97 which protrudes from the shaft 16 and defines the shoulder 96 is preferably formed integrally with the shaft. Alternatively, snap rings and grooves may be used to locate members 24 and 98. To facilitate the assembly, the outer race 100 of ball bearing 82 is preferably lightly friction fitted with both radially inward facing surface 102 of the flange 32 and the radially inward facing surface 104 of the lip 36 and is in abutting relation with the shoulder 105.

As shown, a plurality of balls 106 are disposed in retainers between the inner and outer races of each of the ball bearings 60, 62, 82 and 84 in the conventional manner. Bearing assemblies 60 and 62, which are exposed to the external environment, are preferably grease lubricated and sealed.

As presently preferred and shown, an annular spring element 108, desirably a Belleville washer or a collection thereof, is disposed between the outboard facing surface of ball bearing 84 and the confronting surface 110 of seal 26. The reasons for this will be more fully apparent hereinafter.

In the preferred embodiment, a pulley 114 is fixedly secured about the inboard end of the member 18. While the pulley 114 is preferably formed separately and fixedly secured about the member 18 by, for example, welding or clamping, it may, in the alternative, be integrally formed therewith. An electrically non-conductive ring 116 of insulating material such as, for example, Bakelite or Micarta is fixedly secured to the inboard facing surface of pulley 114 by, for example, a suitable adhesive. A plurality of slip 120, preferably two or three in number, depending on the application, are, in turn, fixedly secured to the insulating ring 116, also preferably by means of a suitable adhesive. Details of connecting slip rings 120 to field winding 20 have been omitted both for clarity of illustration and because such details are well known to the skilled art worker. As shown, each slip ring 120 contacts one of the brushes 122 which are seated in recesses 124 in the combination brush box and terminal board 126. Preferably, a coil spring 128 is disposed in each recess 124 behind the brushes 122 for urging the brushes into contact with slip rings 120. If desired, brushes 122 may be seated in pulley 114 and slip rings 120 affixed to housing 12. This arrangement has the advantage of simplifying brush replacement since no disassembly is required.

As shown, the member 126 is secured in place by a plurality of screws 130 (two of which are shown in phantom in FIG. 1) which extend through thru-holes (not shown) in the member 126 and are received in threaded blind holes 132 in the compressor housing 12. A plurality of screw terminals 134 in the member 126 serve as points of connection between wires 136 which run to a suitable power supply, and conductors 138 which run to the brushes 122. In normal automotive applications, the wires 136 will be connected to the battery 140 via a conventional one or two pole compressor cycling switch. As presently preferred and shown, however, in order to accommodate both DC and AC operation, wires 136 are connected to battery 140 via three poles 142a of a conventional three pole, three position switch 142, and terminal leads 143. Those skilled in the art will recognize that inasmuch as only two conductors are necessary for DC operation, it may, depending on the design of the field winding, be preferable to electrically connect two of the wires during DC operation as by a conductor 145 on the battery side of the poles 142a. As shown, the additional three poles 142b are used for connecting wires 136 to an AC source diagrammatically illustrated at 148. (While the circuitry shown in the figure implies three phase operation, persons skilled in the art will recognize that three slip rings will also accommodate the starting and running arrangements needed for single phase operation. Such persons will also recognize that capacitors and/or other devices are needed for single phase operation and that these devices are preferably made part of the external circuitry. Since such arrangements are well known to such persons, further details are omitted here.) For engine operation and battery excitation switch 142 is cycled between the "a" contacts and "off", while for AC operation switch 142 is cycled between the "b" contacts and "off".

During such AC operation, certain auxiliaries, such as a condenser fan, may be needed. The evaporator fan is also used, and both may be conveniently powered from the car battery and/or a charger powered by the AC line.

To assemble the unit 10, rotor 24 is first pressed on to shaft 16 from the outboard end and seated adjacent annular shaft flange 97. Rotor bearings 82 and 84 are then pressed on to shaft 16, bearing 82 being seated adjacent shoulder 96 and bearing 84 being seated on recess 94. The inboard end of the compressor shaft 16 is then fed through the opening 14 in compressor housing 12 until the outer race 100 of the inboard rotor bearing 82 is firmly seated adjacent shoulder 105 in the recess defined by the lip 36. Belleville washer 108 is then disposed in seal 26 and the seal is then slid over the outboard end of the rotor-shaft subassembly. The seal 26 is then firmly secured to the housing 12 by the screws 42 and the interface between the flange 32 and lip 36 hermetically sealed.

Bearings 60 and 62 are next installed into the subassembly comprised of member 18 and field 20, the outboard field bearing 62 being seated against the shoulder 54 and secured in place by snap ring 80, and the inboard bearing 60 being pressed into place on surface 58 and seated against shoulder 56. The member 18 is then slipped over the outboard end of the seal 26 until the inner race 66 of the inboard field bearing 60 is seated on the surface 68 of seal flange 32 and the inner race 74 of the outboard field bearing 62 is firmly seated against the shoulder 48. As mentioned earlier, bearings 60 and 62 are preferably prelubricated and sealed, and thus ready for service as installed. Bearings 82 and 84, on the other hand, are lubricated along with the compressor by the oil mist in the refrigerant disposed within the compressor housing 12, with flow to the outboard rotor bearing 84 being accommodated by axially extending thru-passages 150 in the shaft 16.

Proper seating of the member 18 is assured despite build up of manufacturing tolerances by allowing for relative movement between one end of member 18 and seal 26. In the embodiment of FIG. 1, this is accommodated by the sliding fit of inner race 66 of the inboard field bearing 60 on the surface 68 of the seal flange 32. In an alternate construction mentioned earlier, the inner race of bearing 60 is removable and friction fitted with surface 68.

Once the member 18 is properly seated, the snap ring 78 is disposed in the recess 46. Brush box 126 is then secured to compressor housing 12, springs 128 and brushes 122 disposed in recesses 124, and the necessary electrical connections made. Assembly of the unit 10 is completed by securing pulley 114, with insulating ring 116 and slip rings 120 secured thereto, about the member 18, and connecting the slip rings to the field. Of course, if the pulley 114 is formed integrally with the member 18, member 18 should be seated after the brushes are in place.

Alternately, brushes and springs can be fitted into holder 126, and the brush-spring-holder assembly installed as the final operation, using an auxiliary tool to hold the brushes depressed during assembly. This is also the procedure to be followed for brush replacement.

During operation in automotive applications, pulley 114 is continuously rotated, preferably by an engine driven belt (not shown), thereby imparting rotation to the member 18 and field 20. The field is energized in the usual manner, say by a conventional compressor cycling control (not shown). In response to the control, current from the battery 140 will flow through leads 143, switch 142, wires 136, terminals 134 and brushes 122 to the slip rings 120, which, in turn, are connected to the windings of field structure 20.

As is well known in the art, rotation of the DC energized field structure 20 will cause rotor 24 to "see" a rotating magnetic field. This rotating magnetic field will, in turn, induce current flow in the rotor windings, thereby imparting rotation to the rotor 24 and hence compressor shaft 16 as the induced magnetic field continually seeks to align itself with the rotating magnetic field associated with the field 20.

During use of the unit 10, the novel mechanical design of the present invention insures that concentricity amongst field 20, rotor 24 and seal 26 is maintained. Thus, member 18, which supports the field structure 20, is supported solely by the field bearings 60, 62 which are seated on the external wall of the seal 26. Similarly, the shaft 16 which supports rotor 24 is supported solely by the rotor bearings 82, 84 which are seated on the internal wall of the seal 26. Skilled art workers will thus recognize that this kinematic arrangement, wherein all the bearings are piloted to the seal 26, assures continuous concentricity amongst field 20, rotor 24, and seal 26 despite impact loading, whether such loading is external and due, for example, to engine power pulses and vehicle motion, or internal and due, for example, to compressor pulsations. Consequently, seal clearances can be minimized, resulting in more effective coupling.

Another important feature of the present invention is the inclusion of the Belleville washer 108 between the outboard side of bearing 84 and the confronting wall 110 of the seal 26. Since the axial positions of seal 26 and outboard rotor bearing 84 are fixed relative to the housing 12, Belleville washer 108 serves to preload the seal 26 in axial tension. In addition to accommodating variations in axial dimension due, for example, to accumulation of manufacturing tolerances, pressure and temperature differentials, wear, etc., this tension preloading of seal 26 transfers compressive loads which would otherwise buckle the seal to the subassembly comprised of rotor 24 and shaft 16, which, because of its shape is well suited to resist such forces. Obviously, this tension preloading allows the portion 28 of seal 26 to be made thinner, thus enhancing torque transmission between field 20 and rotor 24. This preloading of the seal 26 also effectively eliminates local compressive forces due, for example, to bending moments produced by the overhung compressor eccentric 152 and pulley 114 which could, in the absence of spring 108, result in local buckling of the seal. As presently preferred and shown in FIG. 1, the bending moment due to pulley 114 is reduced by disposing the pulley adjacent compressor housing 12.

Persons skilled in the art will recognize that the Belleville washer is preferred to other spring configurations, because Belleville washers can be designed to exert a force which is substantially constant over the intended range of deflection and thus axially distend the seal without overloading the bearings. These washers can also be "ganged" to match particular load and size restrictions and to friction-damp resonances as required. Skilled art workers will also recognize that the seal is additionally loaded in tension by the pressure differential which results because the refrigerant pressure on the inside surfaces of the seal is greater than the atmospheric pressure on the outside, and that the forces due to this pressure differential are, like those due to the Belleville washer, substantially independent of deflection. While there may be applications in which seal loading can be provided solely by this pressure differential, automotive applications do not normally fit this category because the refrigerant pressure varies as a function of the outside ambient temperature, while the exterior seal forces do not, and because automotive air conditioners are normally vacuum purged before introducing the refrigerant.

It will be apparent that in order to achieve optimum coupling between field 20 and rotor 24, not only must seal 26 be as thin as possible and clearances minimized, but in addition the seal should be comprised of a material which will minimize both eddy current and hysteresis losses. Thus, the preferred seal material wil be substantially non-magnetic and will have a high resistivity. Other considerations include compatibility with environments on either side of the seal, and on these bases a non-magnetic stainless steel is an acceptable choice. In selecting the seal material it should be recognized that these considerations are not absolute and that, for example, a high resistivity magnetic material such as silicon steel may actually be a better choice than a low resistivity non-magnetic material such as copper or aluminum.

As noted above, the novel hermetic sealing of the compressor shaft 16 by the seal 26 eliminates refrigerant leakage at the compressor shaft. In addition to the obvious advantage of increased reliability of the air conditioning unit resulting from this construction, elimination of refrigerant leakage into the atmosphere also provides significant environmental benefits because it eliminates what will become a major source of fluorocarbon pollution when "spray can" legislation becomes effective.

As noted above, the assembly 10 can also be adapted for "AC " operation. One advantageous use of the AC mode is that of driving the compressor at a speed different from that at which the pulley 114 is driven by the belt. This is accomplished by superimposing an electrical rotation of the field 20 upon its mechanical rotation, so that the rotor 24 "sees" a field rotating at either sum or difference speeds, and responds accordingly. This is accomplished by closing switch 142 in the "b" position, thus connecting the leads 136 to a cyclo-converter or an inverter illustrated diagrammatically at 148. While this modification is sound in concept, its application is presently limited by the cost of the additional electronic circuitry required. This limitation does not, of course, apply to the case mentioned earlier where the air conditioner is powered directly by the AC utility lines, the field structure of the hermetic clutch serving as stator and the rotor as rotor of a conventional induction motor.

Skilled art workers will recognize that means other than a belt driven pulley may be employed to rotate the member 18. For example, referring to FIG. 3, an alternative embodiment wherein the pulley drive is replaced by a shaft drive is shown. As illustrated, the outboard end of the member 18 is modified to include a cylindrically shaped protruding portion 160 having a splined hole 162 in axial alignment with the member 18. During installation on the vehicle, an engine driven shaft 164 having a splined end 166 is received in the hole 162. Consequently, rotation of the engine driven shaft imparts rotation to the member 18 and field structure 20, which, in turn, imparts rotation of the rotor and compressor shaft as is more fully described above. When this embodiment is employed, a suitable annular flange will be secured about the inboard portion of the member 18 for supporting the slip rings. While FIG. 3 shows the shaft spline as external and the spline in member 28 as internal, it is obvious that external and internal splines can be interchanged.

In the embodiment illustrated in FIG. 4, the pulley 114 is replaced by an externally toothed annular gear 170 having a flange 172 on its inboard side to which slip rings 120 are secured. Gear 120 engages with and is driven by an engine driven gear (not shown).

While, as noted above, the location of the Belleville washer 108 illustrated in FIG. 1 is preferred, other arrangements which also serve to preload seal 26 in tension are possible.

For example, referring to FIG. 5, a second Belleville washer 190 is disposed between compressor housing 12 and the inner race 66 of inboard field bearing 60. This arrangement is similar to that of FIG. 1 in that outer race 64 is friction fitted against surface 58 and is seated against shoulder 56, while inner race 66 is slidably seated on surface 68. Here, however, the option of a removable race cannot be considered because such an arrangement would not transmit the force produced by Belleville washer 190.

In this embodiment, the spring force bearing on inner race 66 resulting from Belleville washer 190 is transmitted through balls 106 of bearing 60 to outer race 64, and then to member 18. This, in turn, pushes snap ring 80 and hence bearing 62 to the left in FIG. 5. As a result, snap ring 78 is also pushed to the left, thus loading seal 26 in tension. In this embodiment, the radially outward step in cylindrical portion 44 of seal 26 which defines shoulder 48 in FIG. 1 is eliminated so that snap ring 78 may be installed without loading seal 26 in compression. Since the arrangement of FIG. 5 offers the option of deleting spring 108, spring 108 is shown in phantom.

A still different arrangement for loading seal 26 in tension is illustrated in FIG. 6. Like the embodiment illustrated in FIG. 5, a second Belleville washer 200 is used, but here it is interposed between inner race 74 of bearing 62 and snap ring 78. Clearly, washer 200 pushes snap ring 78 to the left, thus loading seal 26 in tension while simultaneously pushing bearing 62 to the right thus loading member 18 in compression via snap ring 80. In this embodiment it may be necessary to extend the inner race 66 of bearing 60 or otherwise modify housing 12 in order to avoid contact between rotating member 18 and non-rotating housing 12.

As described in connection with FIG. 5, compressive loading of seal 26 during installation of snap washer 78 is avoided by eliminating the radially outward step in cylindrical portion 44 which defines the shoulder 48 in FIG. 1, thus allowing inner race 74 of bearing 62 to move to the right. In addition, the outboard end of the portion 44 is provided with a threaded blind hole 202 into which a suitable externally threaded tool (not shown) may be inserted in order to effect installation of snap ring 78 without compressively loading seal 26. Since this arrangement also offers the option of deleting spring 108, this spring is again shown in phantom.

A variety of additional changes and modifications of the assembly 10 illustrated in FIG. 1 are obvious to persons skilled in the art. Examples include substitution of rollers for ball bearings, bearing locking arrangements employing nuts and tab washers, positive axial positioning of the outer race of bearing 60 of FIG. 1 say by a lock arrangement similar to that employed with bearing 62 of that figure, relocation of Belleville spring 108 to a position adjacent the inboard shaft bearing, and modifications to accommodate "rotary " compressors.

Skilled art workers will also recognize that additional support can be provided for the outboard end of the unit 10 by, for example, an L-shaped bracket fixedly secured to the compressor housing 12 and the outboard end of seal 26. However, this modification is not preferred since it constrains the seal and can result in misalignment due to build-up of manufacturing tolerances, heating, etc., which, in turn, can cause seal buckling.

Also, while arrangements wherein the refrigerant is confined to the region outside the seal 26 are possible, the embodiment illustrated in FIG. 1 is preferred because seals will buckle at lower pressure differentials than those at which they burst, and because in the alternate arrangement differential pressures act in opposition to the spring.

As noted above, field 20 and rotor 24 have been illustrated diagrammatically in recognition of the fact that any of a variety of well known configurations may be employed for effecting electromagnetic coupling therebetween. For example, in addition to induction motor coupling more fully described above, synchronous (with starting and damping effected by other means) or combination induction start-synchronous run coupling may also be used.

When, as is currently preferred, excitation is effected on the basis of a rotating field coil, the field structure may assume a Lundel, an inductor, or a conventional salient or non-salient pole configuration. Also possible is the use of permanent magnets. However, where this last variation is employed, skilled art workers will recognize that a separate clutch is required.

Also possible is a "brushless" arrangement which eliminates slip rings 120 and brushes 122, thereby providing truly "wear-free" clutching. This may be accomplished by employing a fixed coil arrangement, for example a parasitic Lundel configuration, and securing the coil to the compressor housing. Since these as well as other coupling techniques are in wide commercial use and well known to persons skilled in the art, further description thereof is deemed unnecessary. While such brushless arrangements are appropriate for commercial vehicles such as busses and trucks whose lives are measured in hundreds of thousands of kilometers and wherein "brushless" alternators are also preferred, the cost effective choice for conventional passenger vehicles is the "brush" embodiment of FIG. 1 as confirmed by the choice of "brush" type alternators for these vehicles.

Moreover, while the construction of seal 26 illustrated in FIG. 1 is preferred, other designs are also possible, for example, one having a reduced diameter section between the compressor housing 12 and seal portion 28. It is also possible, if preferred, to replace the Belleville washer with, for example, gas filled flexible capsules, or bellows, or rubber in shear.

It should also be recognized that the hermetic clutch of the invention is suitable for operation at sub-freezing temperatures and thus may be used as an automotive air conditioner which can also serve as a heat pump. Conventional seals cannot survive such operation because ice crystals will destroy them.

It is also noted that the term "snap ring" has been used throughout as a generic designation for the collection of devices alternately called "retaining rings", "lock rings", and "circlips" in the literature.

Since these as well as additional changes and modifications are within the scope of the present invention as defined by the following claims, the above descriptions should be construed as illustrative and not in a limiting sense.

I claim:

1. In an hermetic assembly for driving a shaft, the assembly being adapted for securement to a non-rotating structure which, in combination with the assembly, defines an hermetic environment in which the shaft is disposed; the assembly being of the type including a first elongate generally annular-shaped member defining inner and outer cylindrical walls and a second elongate generally cylindrically shaped member concentrically disposed within the first member and defining an outer cylindrical wall of diameter less than the diameter of the inner wall of the first member, thereby defining an annular space between the members; and wherein the shaft is coupled to one of the members for rotation therewith, the improvement which comprises:

drive transmission means operatively connected to the other of said members and adapted for engagement with a rotating member for effecting rotation of said other member upon rotation of said rotating member;

means for electromagnetically coupling said first and second members for imparting rotation to said one member upon rotation of said other member;

an elongate generally annular-shaped hermetic seal closed at one end, the annular portion of said seal defining inner and outer cylindrical walls, said seal being disposed in surrounding spaced relation with said second member with said annular portion extending through said space, said inner cylindrical seal wall in close spaced relation with the outer wall of said second member and said outer cylindrical seal wall in close spaced relation with the inner wall of said first member;

means for fixedly joining the other end of said seal to said structure and means for making the joint therebetween hermetic;

means for preloading said seal for maintaining the annular portion of said seal in axial tension whereby to enhance the structural integrity thereof;

first means for supporting said second member for rotation relative to said seal and for maintaining concentricity therebetween; and second means for supporting said first member for rotation relative to said seal and for maintaining concentricity therebetween.

2. The hermetic assembly of claim 1, wherein said one member is said second member, said structure has a hole therein through which a portion of said shaft extends and said other end of said seal is fixedly secured to said structure externally thereof adjacent said hole with said seal in axial alignment with said shaft.

3. The hermetic assembly of claim 2, wherein said drive transmission means comprises a pulley disposed in surrounding relation with the outer wall of said first member and wherein said rotating member comprises a belt for driving said pulley.

4. The hermetic assembly of claim 3, wherein said pulley is disposed about said first member in close spaced relation with said structure.

5. The hermetic assembly of claim 2, wherein said drive transmission means comprises an annular gear disposed in surrounding relation with the outer wall of said first member, and wherein said rotating member comprises another gear for driving said annular gear.

6. The hermetic assembly of claim 5, wherein said annular gear is disposed about said first member in close spaced relation with said structure.

7. The hermetic assembly of claim 2, wherein said drive transmission means comprises an annular internally splined flange fixedly secured to the end of said first member nearest said one closed end of said seal and in axial alignment with said shaft, and wherein said rotating member comprises another shaft having an externally splined end receivable with said annular flange.

8. The hermetic assembly of claim 2, wherein said second member has an axial bore extending therethrough in which said shaft portion is fixedly received.

9. The hermetic assembly of claim 8, wherein said first supporting means comprises a pair of bearings interposed between said seal and said shaft on either side of said second member.

10. The hermetic assembly of claim 9, wherein said means for axially distending said seal comprises a spring interposed between the closed end of said seal and the one bearing of said pair in confronting relation therewith.

11. The hermetic assembly of claim 10, and further comprising means for seating said one bearing for relative axial movement with respect to said seal; means for seating said one bearing for restricting relative axial movement thereof with respect to said shaft; and means for seating the other bearing of said bearing pair for restricting relative axial movement thereof with respect to both said shaft and said seal.

12. The hermetic assembly of claim 11, wherein said bearings comprise inner and outer annular races and a plurality of balls disposed therebetween, and wherein said inner races are seated about said shaft and said outer races are seated on said inner wall of said seal.

13. The hermetic assembly of claim 12, wherein: said means for seating said one bearing for relative axial movement with respect to said seal comprises the outer race of said one bearing being slidably seated on said seal inner wall; said means for restricting relative axial movement of said one bearing with respect to said shaft comprises means for restricting relative axial movement of said inner race of said one bearing with respect to said shaft; and said means for restricting relative axial movement between said other bearing and said shaft and said seal comprises means for restricting relative axial movement between the inner race thereof and said shaft, and the outer race thereof and said seal, respectively.

14. The hermetic assembly of claim 13, wherein said spring comprises a Belleville washer in contact relation with said closed end of said seal and said outer race of said one bearing.

15. The hermetic assembly of claim 14, wherein said means for restricting relative axial movement of said inner race of said one bearing with respect to said shaft comprises a radial inwardly extending shoulder on said shaft adjacent the end of said shaft portion for defining a circumferentially extending recess, said inner race of said one bearing being seated in said recess in abutting relation with said shoulder; said means for restricting relative axial movement between said inner race of said other bearing and said shaft comprises a radial outwardly extending shoulder on said shaft between said second member and said other bearing, said inner race of said other bearing being seated in abutting relation with said last-mentioned shoulder; and said means for restricting relative axial movement between the outer race of said other bearing and said seal comprises a radial outwardly extending shoulder in the circular surface of said structure defining said hole for defining an enlarged hole portion whose circular defining surface is flush with the inner cylindrical wall of said seal, said outer race of said other bearing being partially seated on said seal inner wall and partially seated on said last-mentioned circular surface in abutting relation with said last-mentioned shoulder.

16. The hermetic assembly of claim 15, wherein said structure comprises a compressor housing and said shaft comprises a compressor shaft.

17. The hermetic assembly of claim 16, wherein said shaft is provided with at least one axially extending thru-hole therein and further comprising a refrigerant combined with oil mist disposed in said housing, said thru-hole providing a conduit for flow of said oil mist to said one bearing for effecting lubrication thereof.

18. The hermetic assembly of claim 2, wherein said second supporting means comprises a pair of bearings disposed between said first member and said seal at either end thereof, and further comprising means for seating said bearings for restricting relative axial movement thereof with respect to both said first member and said seal.

19. The hermetic assembly of claim 18, wherein said means for axially distending said seal comprises a spring interposed between said structure and the one bearing disposed at said other end of said seal.

20. The hermetic assembly of claim 19, wherein: said second member has an axial bore extending therethrough in which said shaft portion is fixedly received; said first supporting means comprises an other pair of bearings interposed between said seal and said shaft on either side of said second member, and wherein an additional spring is interposed between the closed end of said seal and the one bearing of said other bearing pair in confronting relation therewith.

21. The hermetic assembly of claim 18, and further comprising a member extending radially outward from said seal outer wall in spaced relation from the one bearing disposed about the closed end of said seal, said member being disposed on the side of said one bearing opposite the side thereof confronting the bearing disposed about said other end of said seal, and wherein said means for axially distending said seal comprises a spring interposed between said one bearing and said member.

22. The hermetic assembly of claim 21, wherein said second member has an axial bore extending therethrough in which said shaft portion is fixedly received; wherein said first supporting means comprises another pair of bearings interposed between said seal and said shaft on either side of said second member; and wherein an additional spring is interposed between the closed end of said seal and the one bearing of said other bearing pair in confronting relation therewith.

23. The hermetic assembly of claim 1, wherein said seal is comprised of a non-magnetic material of high resistivity.

24. The hermetic assembly of claim 23, wherein said seal is comprised of non-magnetic stainless steel.

25. The hermetic assembly of claim 2, wherein said other end of said seal includes a radially outwardly extending flange having a plurality of spaced thru-holes therein, said portion of said structure adjacent said hole is provided with a plurality of spaced threaded blind holes in alignment with said flange thru-holes, and wherein said means for fixedly joining said other end of said seal to said structure comprises a plurality of screws extending through said thru-holes and threadably received in said blind holes.

26. The hermetic assembly of claim 2, wherein said means for electromagnetically coupling said first and second members comprises a direct current source; a field winding associated with said first member; means for supplying current from said source to said field winding for establishing a magnetic field associated therewith; and means associated with said second member for establishing a second magnetic field associated with said second member, whereby as said first member is rotated, rotation will be imparted to the second member as the magnetic field associated with said second member seeks to align itself with the rotating magnetic field associated with said first member.

27. The hermetic assembly of claim 26, wherein said means for supplying current from said source to said field winding comprises a plurality of slip rings disposed in surrounding relation with said first member and in confronting relation with said structure, a plurality of brushes mounted on said structure in contact relation with said slip rings, first wire means for supplying current from said direct current source to said brushes and second wire means for supplying current from said slip rings to said field winding.

28. The hermetic assembly of claim 27, wherein said drive transmission means includes a circumferentially extending surface disposed about said first member in confronting relation with said structure and wherein said slip rings are mounted on said surface.

29. The hermetic assembly of claim 26, and further comprising switching means interposed between said direct current source and said field winding for interrupting current flow from said source to said winding whereby clutching of said second member may be effected by opening and closing said switch.

30. The hermetic assembly of claim 26, and further comprising an alternating current source; means for supplying current from said alternating current source to said field winding; and switching means movable between a first position wherein said field winding is connected to said direct current source supplying means and a second position wherein said field winding is connected to said alternating current source supplying means for accommodating connection of said field winding to either said direct current source or said alternating current source.

31. The hermetic assembly of claim 30, wherein said field winding comprises a convention polyphase winding and said means associated with said second member for establishing said second magnetic field comprises a conventional squirrel cage winding whereby rotation of said first member induces a current flow in said other winding for establishing said second magnetic field.

32. The hermetic assembly of claim 31, wherein said field winding comprises a convention single phase winding and said means associated with said second member for establishing said second magnetic field comprises a conventional squirrel cage winding whereby rotation of said first member induces a current flow in said other winding for establishing said second magnetic field.

33. The hermetic assembly of claim 30, and further comprising frequency changing means for varying the speed of rotation imparted to said second member when said drive transmission means is driven by said rotating member, and wherein said switching means further comprises means for connecting said frequency changing means to said field winding.

34. The hermetic assembly of claim 33, wherein said frequency changing means is a cycloconverter.

35. The hermetic assembly of claim 33, wherein said frequency changing means is an inverter.

* * * * *